United States Patent
Bauer et al.

(10) Patent No.: US 7,968,168 B2
(45) Date of Patent: Jun. 28, 2011

(54) POLYMER FILM FOR SURFACE COATING FIBER/PLASTICS COMPOSITE MATERIALS

(75) Inventors: Monika Bauer, Koenigs Wusterhausen (DE); Hans-Juergen Karl, Hamburg (DE); Rajko Wurzel, Berlin (DE)

(73) Assignee: Mankiewicz Gebr. & Co. GmbH & Co. KG, Hamburg (DE)

( * ) Notice: Subject to any disclaimer, the term of this patent is extended or adjusted under 35 U.S.C. 154(b) by 228 days.

(21) Appl. No.: 12/448,443

(22) PCT Filed: Dec. 20, 2007

(86) PCT No.: PCT/DE2007/002296
§ 371 (c)(1),
(2), (4) Date: Jun. 19, 2009

(87) PCT Pub. No.: WO2008/077385
PCT Pub. Date: Jul. 3, 2008

(65) Prior Publication Data
US 2010/0112338 A1    May 6, 2010

(30) Foreign Application Priority Data

Dec. 22, 2006    (DE) .......................... 10 2006 062 248
Jan. 31, 2007    (DE) .......................... 10 2007 004 901

(51) Int. Cl.
*B32B 3/12*    (2006.01)
(52) U.S. Cl. .................... 428/116; 156/307.4; 264/257; 428/339
(58) Field of Classification Search .................. 428/116, 428/339, 375, 292.1; 156/307.4; 264/257
See application file for complete search history.

(56) References Cited

U.S. PATENT DOCUMENTS

| | | | |
|---|---|---|---|
| 4,940,848 A * | 7/1990 | Shimp ........................ | 156/307.4 |
| 5,141,972 A * | 8/1992 | Sato .............................. | 523/218 |
| 5,523,148 A * | 6/1996 | Afzali-Ardakani et al. .. | 442/169 |
| 5,527,593 A * | 6/1996 | Afzali-Ardakani et al. .. | 428/209 |
| 5,527,838 A * | 6/1996 | Afzali-Ardakani et al. .. | 523/223 |
| 5,529,836 A * | 6/1996 | Afzali-Ardakani et al. .. | 442/234 |
| 5,599,611 A * | 2/1997 | Afzali-Ardakani et al. .. | 442/180 |
| 6,242,636 B1 * | 6/2001 | Slaney et al. ................... | 560/59 |
| 6,458,993 B1 * | 10/2002 | Lin et al. ........................ | 560/301 |
| 6,734,497 B2 * | 5/2004 | Takahashi et al. ............. | 257/341 |
| 7,581,366 B2 * | 9/2009 | Smith et al. ................... | 52/794.1 |
| 2006/0223921 A1 | 10/2006 | Bauer et al. | |
| 2008/0032089 A1 * | 2/2008 | Bauer et al. ................... | 428/116 |
| 2008/0119630 A1 | 5/2008 | Bauer et al. | |
| 2010/0112338 A1 * | 5/2010 | Bauer et al. ................... | 428/325 |

FOREIGN PATENT DOCUMENTS

| | | |
|---|---|---|
| DE | 10 2006 041 037 | 11/2007 |
| EP | 0 295 375 | 12/1988 |
| EP | 0 581 314 | 2/1994 |
| EP | 1 710 264 | 10/2006 |
| EP | 1 854 828 | 11/2007 |

OTHER PUBLICATIONS

Bauer, M. et al., "Networks from dicyanate of bisphenol A and diphenols," Jan. 1991, Makromolekulare Chemie, Macromolecular Symposia, vol. 45, Huthig and Wepf Verlag, pp. 97-103. XP-009087791 (ISR) (IPRP).
Fang et al., "Polycyanate esters: Science and applications," Jan. 1995, Progress in Polymer Science, vol. 20, Pergamon Press, pp. 61-118. XP-005900012 (ISR) (IPRP).
Roempp-Lexikon Lacke and Druckfarben; Editor U. Zorll, Georg Thieme Verlag Stuttgart New York, 1998, p. 237 (with translation).
A. Franck, Kunststoff-Kompendium [Plastics Compendium], Vogel Buchverlag, Wuerzburg, 1996, pp. 246-249 (with translation).

* cited by examiner

*Primary Examiner* — N. Edwards
(74) *Attorney, Agent, or Firm* — Collard & Roe, P.C.

(57) ABSTRACT

The use of a substrate supported polymer film as a surface coating for fiber/plastics composite structures produced by the crushed core method from composite structures having a core and at least one prepreg layer, wherein the polymer film is applied to a prepreg surface with its resin side facing the surface before the composite structure is cured and optionally before it is placed in the mold, and curing is effected under applied pressure and at an elevated temperature. The substrate supported polymer film comprises a resin matrix which has a degree of crosslinking that is below its gel point, and which is produced from at least one difunctional or polyfunctional aromatic organic cyanate and at least one difunctional or polyfunctional aromatic alcohol in proportions giving a molar ratio of OCN groups to OH groups in the starting materials used for the production of the prepolymer of from 95:5 to 70:30, and which also contains at least one filler.

16 Claims, No Drawings

POLYMER FILM FOR SURFACE COATING FIBER/PLASTICS COMPOSITE MATERIALS

CROSS REFERENCE TO RELATED APPLICATIONS

This application is the National Stage of PCT/DE2007/002296 filed on Dec. 20, 2007, which claims priority under 35 U.S.C. §119 of German Application No. 10 2006 062 248.0 filed on Dec. 22, 2006 and German Application No. 10 2007 004 901.5 filed on Jan. 31, 2007. The international application under PCT article 21(2) was not published in English.

The invention relates to the use of a resin matrix for the production of a substrate supported polymer film for surface coating fiber/plastics composite materials and to a method for coating fiber/plastics composite materials produced using prepreg.

Fiber/plastics composite materials are widely used in aeronautical engineering on account of their favorable properties such as their lightweight properties and their high tensile strength. Thus they are used, for example, for the interior installation of passenger aircraft. These interior elements, such as side walls or hat racks, have to exhibit a particularly good surface quality, since they are in the direct field of vision of the passengers.

In order to acquire maximum mechanical properties combined with minimum weight, the building elements are usually produced as sandwich structures. To this end, use is made of honeycomb material made of phenolic resin-impregnated paper (known, for example, under the trade name Nomex Honeycomb) as the core, and thin layers of prepreg.

Prepreg designates a semifinished product consisting of rovings and an uncured thermosetting plastics matrix. The rovings may be in the form of a unidirectional layer, as fabric or as scrim. Commonly used types of fiber are, for example, glass fibers, carbon fibers, or aramide fibers. Glass fibers are commonly used.

The plastics matrix contains a mixture of resin and curing agent and optionally accelerators. The curing agent and possibly the accelerator determine the curing temperature, that is to say, the temperature at which the curing process commences. The matrix systems are differentiated according to their curing temperature and the type of resin.

A number of different methods is employed for the production of the sandwiched structures. The methods involve making the structure by placing the aforementioned structure in a mold and curing it in the mold.

In the vacuum bag method, prepreg is first placed in the mold, followed by the honeycomb and then again by prepreg. The mold is then transferred to a vacuum bag and a vacuum is applied. When the structure has adapted itself to the mold, the latter is heated to start the curing process. The starting temperature depends on the matrix system used.

Another variant of the vacuum bag method is the so-called autoclave method. With this method, the evacuated vacuum bag containing the structure is cured in an autoclave under elevated pressure and at an elevated temperature.

In the hot press method, the structure prepreg/honey comb/prepreg is placed in a heated mold and compressed under applied pressure. Unlike the vacuum bag method, the mold is in this case already at the temperature required for curing, and consequently the sandwich structure must be produced before it is placed in the mold.

Flame retardancy is an important factor for aircraft construction elements, particularly interior elements. Flame retardancy is the property of materials, products, or components, to resist the action of flames or ignition sources or is the ability thereof to prevent the spread of fire by energy-related, kinetic, chemical, or mechanical routes. The term is not standardized and the property is as such not measurable (cf. Roempp-Lexikon Lacke and Druckfarben; Editor U. Zorll, Thieme Verlag Stuttgart New York, 1998; Kunststoff-Kompendium, A. Franck, Vogel Buchverlag, Wuerzburg, 1996). The testing methods for flame retardancy simulate the circumstances of a real fire under reproducible conditions. Depending on the testing methods, various physico-chemical data are recorded, such as the flash point and ignition temperature or the composition of the pyrolysate vapors.

In order to satisfy the demands regarding the FST (Flammability, Smoke, Toxicity) properties in the cabin area in civil aviation, prepreg based on phenol formaldehyde resins (for short, phenolic resins) is usually used as the material for interior elements. Phenolic resins exhibit suitable burning properties for this application: when burning, they develop less toxic gas than other thermosetting plastics and extinguish on removal of the flame.

Phenolic resins belong to the classical condensation resins, i.e. they polymerize or crosslink with elimination of water. Since the molded prepreg is normally cured at temperatures above 100° C., for example, at from 130° C. to 200° C., the escaping steam hinders the formation of a tightly closed surface. Thus the raw structures usually have a very poor surface finish.

In order to acquire the desired coloration and structure of the surface of the elements for the cabin area, the structures then have to be varnished or laminated with film. However, a high surface finish is necessary for this purpose. This is usually achieved by priming and subsequent sanding of the element, and such operations may possibly have to be repeated. This requires a very high expenditure of time and labor and thus involves high costs.

In order to eliminate these operations, is it desirable to employ an in-mold coating method. In-mold coating is a surface coating which is applied before the prepreg structure is placed in the mold and cured or is formed during the molding process. The in-mold coating should improve the surface quality of the raw structure such that it can be varnished or laminated without elaborate preparation. Moreover, the FST requirements must still be satisfied.

Solvent-based in-mold coating systems are known which are applied to the mold surface prior to insertion of the prepreg. However, the use of such systems in the vacuum bag method does not give the desired results. Due to the geometrical shape of the mold, the solvent is in some regions of the mold only insufficiently removed by the vacuum. This leads, during subsequent curing at an elevated temperature, to the formation of blisters and craters on the surface of the component.

In the hot press method solvent-based in-mold coating systems are not applicable, since the temperature of the molds is much higher than the boiling points of the solvents usually employed. The high temperature causes the solvent to immediately evaporate out of the system, so that no uniform film is obtained.

Another possibility involves the use of solvent-free systems as in-mold coating. Gel coats are an example thereof, these being employed for enhancement of epoxy resin laminates.

It is an object of the present invention to improve the surface quality of cured structures made of fiber/plastics composite materials. In particular, the invention is required to improve the surface quality of structural components made of prepreg.

This object is achieved by the use of a substrate supported polymer film as defined in claim 1 and by the method as defined in claim 14. Special embodiments are defined in the subordinate claims and in the description.

In the present invention, there is employed, for the production of the substrate supported polymer film, a resin matrix containing at least one difunctional or polyfunctional aromatic organic cyanate and at least one difunctional or polyfunctional aromatic alcohol in proportions ensuring a molar ratio of OCN groups to OH groups in the starting materials of said resin matrix of between 95:5 and 70:30, and also containing at least one filler.

Preference is given to the use of a cyanate component and an alcohol component in proportions giving a molar ratio of OCN groups to OH groups in the starting materials of said resin matrix of from 93:7 to 75:25 and more preferably from 91:9 to 80:20.

The resin matrix in the polymer films of the invention has a degree of crosslinking which is below its gel point. This makes it possible to process and cure the components at a temperature ranging from approximately 100° C. to 200° C. The use of the resin matrix described in German Patent Application DE 102006041037.8 also causes the polymer films to show good stability in storage and low brittleness. The materials obtained by curing the polymer films of the invention show a high flame retardancy, due to the fact that in the case of fire the heat dissipation rates are low, the combustion gas density is low, and the pyrosylate gases formed show low toxicity.

Finding suitable cyanate resin matrices for use in the present invention was not easy since particularly good flameproof cyanate resins based on phenol novolaks, such as PT resins supplied by Lonza have, when fully cured, very high glass transition temperatures. In order to acquire quantitative conversion of the cyanate groups, it is therefore necessary to employ high curing temperatures. It is possible to cure at low temperatures, since the reaction can be accelerated, for example, by the use of conventional catalysts such as metall acetyl acetonate complexes. But the use of such catalysts will not reduce the maximum glass transition temperature. At curing temperatures far below that necessary for maximum conversion of the OCN groups, the reaction freezes at a specific OCN conversion. This OCN conversion is governed by the curing temperature or its distance from the maximum glass transition temperature, i.e. from the glass transition temperature at maximum OCN conversion. But at lower conversions cyanate networks are brittle.

Thus it might have been possible to look for other catalysts which are at the same time network modifiers. They should expand the network and at the same time catalyse the crosslinking reaction of the cyanate resins (trimerization). A network expansion would reduce the glass transition temperature such that curing temperatures could be used which are below the temperature required by pure cyanate resins. This would likewise avoid the occurrence of the aforementioned embrittlement caused by insufficient conversion of the OCN groups.

This search, however, gave rise to problems. The addition of monofunctional phenols described in the literature, for example, would not appear to be promising. Monofunctional phenols such as are used in the prior art are incorporated in the polymer during the reaction. The underlying mechanism is very complex. It was found that the number of OH groups remains constant despite the incorporation of the phenols. The reason is as follows: for each chemically added OH group there is liberated an OH group at a different position. Thus the effect of the monofunctional phenol is that out of a trifunctional crosslinkage a difunctional link is formed, since the OH group forms a network chain terminus. By this means, monofunctional phenols cause the network density to be excessively reduced. They thus lower the glass transition temperature to a point distinctly lower than any desired level and are therefore not suitable for the purposes of the present invention.

Besides, the resin matrix is found to have an undesirably high sol content. Another drawback resides in the fact that components showing relatively high volatility remain in the resin matrix and can later give rise to gas evolution. This should again be avoided, since, as already explained above, the result can be an inadequate surface quality of the coating of the invention caused, for example, by the formation of blisters on or in the surface. Moreover, the starting components are volatile, which can lead to problems during processing and handling.

In addition, due to the presence of hydroxyl groups in the resin matrix, it would have been expected that the crosslinking reaction forming the polymer film would, at least over prolonged periods of time such as can occur during storage, not stop, as would be necessary, before the gel point is reached but would continue to a degree of crosslinking which lies far above the gel point. In this case, the polymer film would no longer be capable of being homogeneously fused onto the mold and thus no longer processable within the scope of the invention. Good stability in storage is, however, absolutely necessary, since the polymer films produced according to the invention using the resin matrices must frequently be stored for a relatively long period of time before they are transferred to the final curing stage.

The choice of multifunctional cyanates used as starting component for the resin matrix to be used is not critical. Theoretically, any at least bifunctional aromatic cyanate body can be used. Preferably, for the production of the resin matrix, use is made of one or more difunctional or polyfunctional aromatic organic cyanates, which are selected from the group consisting of aromatic cyanates of formula I

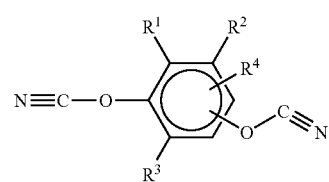

in which $R^1$ to $R^4$ independently denote hydrogen, linear or branched $C_{1-10}$ alkyl, $C_{3-8}$ cycloalkyl, alkoxy, halogen, phenyl, or phenoxy, wherein the alkyl or aryl groups may be fluorinated or partially fluorinated, aromatic cyanates of formula II

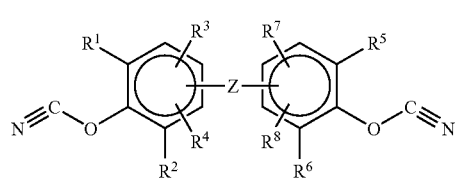

in which $R^5$ to $R^6$ are as defined for $R^1$ to $R^4$ and z is a chemical bond, $SO_2$, $CF_2$, $CH_2$, CHF, $CH(CH_3)$, isopropylene, hexafluoro-isopropylene, $C_{1-10}$ alkylene, O, $NR^9$, N=N, CH=CH, COO, CH=N, CH=N—N=CH, alkylene oxyalkylene comprising $C_{1-8}$ alkylene, S, Si(CH$_3$)$_2$ or a radical of the formula IIa, IIb or IIc

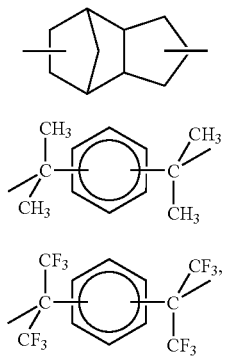

IIa

IIb

IIc and aromatic cyanates of formula III

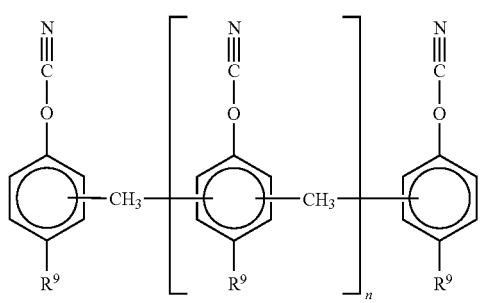

III in which $R^9$ is hydrogen or $C_{1-10}$ alkyl and n denotes a value of from 0 to 20. The said cyanates can be used as monomers or as pre-crosslinked polymers, alone or intermixed or in admixture with other monofunctional or polyfunctional cyanates.

For the production of the resin matrix particular preference is given to the use of one or more difunctional or polyfunctional aromatic organic cyanates selected from the group consisting of novolak cyanates, bisphenol-A dicyanate derivatives, 4,4'-ethylidene diphenyl dicyanates or compounds of formula III

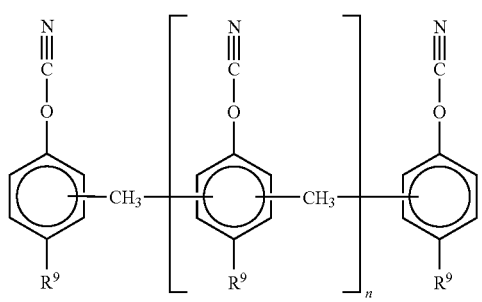

III in which n is equal to 1, 2, or 3, $R^9$ is a hydrogen atom, and the methylene group is in each case in the ortho position relative to the cyanate group.

The difunctional or polyfunctional (polyhydric) aromatic alcohols to be used are preferably compounds of the formulas IV

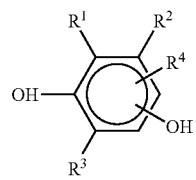

IV in which $R^1$ to $R^4$ independently denote hydrogen, linear or branched $C_{1-10}$ alkyl, $C_{3-8}$ cycloalkyl, $C_{1-10}$ alkoxy, halogen, phenyl, or phenoxy, wherein the alkyl or aryl groups may be fluorinated or partially fluorinated, compounds of formula V

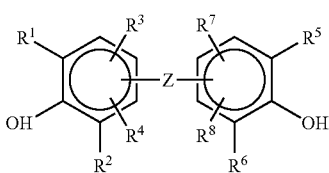

V in which $R^5$ to $R^6$ are as $R^1$ to $R^4$ and z is a chemical bond, SO$_2$, CF$_2$, CH$_2$, CHF, CH(CH$_3$), isopropylene, hexafluoroisopropylene, $C_{1-10}$ alkylene, O, NR$^9$, N=N, CH=CH, COO, CH=N, CH=N—N=CH, alkylene oxyalkylene comprising $C_{1-8}$ alkylene, S, Si (CH$_3$)$_2$ or a radical of the formula IIa, IIb or IIc IIa IIb IIc and compounds of formula VI

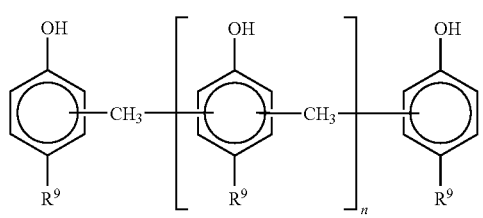

VI in which $R^9$ is hydrogen or $C_{1-10}$ alkyl and n denotes a value of from 0 to 20. The said alcohols can also be employed as monomers or as pre-crosslinked polymers, alone or intermixed or in admixture with other monofunctional, difunctional, or polyfunctional alcohols.

Preferably, the polyhydric aromatic alcohols are difunctional or polyfunctional phenols. However, use may be made, for example, of condensed aromatics such as naphthol derivatives. Particular preference is given to the use of aromatic difunctional alcohols, in which each hydroxyl group is directly bonded to the aromatic ring. Preference is given to bisphenols, such as bisphenol A, 4,4'-ethylidene diphenol, and bis(hydroxy phenyl)sulfide.

Although the use of the aromatic alcohols having the meanings stated above involves compounds whose catalytic action would lead one to expect a continued reaction of the resin matrix, surprisingly latency was achieved.

Latency means in this context that, following the heat treatment, the crosslinking reaction of the resin matrix for formation of the polymer film subsides for relatively long periods of time, such as can occur during storage, before the gel point is reached. In this case the polymer film is still capable of being homogeneously fused onto the mold and thus still processable within the scope of the invention.

This latency makes it possible to produce, transfer and store the polymer films made according to the invention using the resin matrix.

The use of the resin matrix according to the invention, in which the above defined cyanate component is modified with the polyhydric phenols defined above, curing of the polymer films of the present invention can be carried out at moderate temperatures, for example, temperatures ranging from 100° C. to 200° C.

In contrast to the prior modification of cyanates with epoxides, there is no detriment of the intrinsic flame retardancy. For this reason, the resin matrix used in the present invention and the polymer film of the invention should preferably be free from epoxy resin components.

If desired, the reactivity of the resin matrix used in the method of the invention can be increased by the addition of known catalysts such as a metal acetyl acetonate.

The resin matrix used in the present invention already possesses an intrinsic flame retardancy due to its network structure (resulting from the heteroaromatic structure and the high nitrogen content). It combines a low heat dissipation rate with a low combustion gas density and a small amount of toxic gases, in the case of fire. In order to satisfy specific demands, particularly the requirements relating to FST (Flammability, Smoke, Toxicity) properties in the cabin area in civil aviation, the substrate supported polymer films of the invention can contain one or more additional flameproofing agents. Preference is given to inorganic flameproofing agents, flameproofing agents containing halogen, nitrogen, or boron, intumescent flameproofing agents, or mixtures thereof.

Suitable inorganic flameproofing agents are, for example, incombustible inorganic fillers such as oxides, hydroxides, hydrated oxides, mixed oxides, sulfides, sulfates, carbonates, phosphates, or fluorides of Mg, Ca, Sr, Ba, Ti, V, Cr, Mn, Fe, Co, Ni, Cu, Zn, Zr, Nb, Mo, Cd, W, Hg, Al, Ga, In, Si, Ge, Sn, Pb, Sb, Bi, aluminum oxides (hydroxides), magnesium oxide, aluminum trihydroxide, magnesium dihydroxyide, metal phosphates, ammonium polyphosphates, borates, zinc borates, sodium tetraborate decahydrate, boric acid, antimony trioxide, antimony pentoxide, red phosphorus, natural or synthetic silicon dioxides such as kieselguhr, silicon dioxide, quartz, cristobalite, silicates, talc, kaolin, mica, asbestos, pumice powder, pearlites, felspar, mullite, wollastonite, vermiculites, basalt, slate flour, glass powder, lava or Al silicates coalesced with quartz, synthetic silicon dioxides such as pyrogenic silicic acid, precipitated silicic acid, silicon dioxides, silica gels, translucent vitreous silica, lamellar silicates, bentonites, sulfates of metals of the second main group such as calcium sulfate, magnesium sulfate, barium sulfate, synthetic and natural carbonates such as calcium carbonate, chalk, calcite or dolomite, silicon carbide, rock wool, graphite, glass balls, hollow spheres of glass, glass fibers, fibrous fillers such as asbestos, inorganic pigments or dyes.

Examples of suitable halogen-containing flameproofing agents are decabromo diphenyl oxide, ethane 1,2-bis(pentabromo phenol), ethylene bis(tetrabromo phthalimide), brominated polystyrene, tribromo diphenyl ether, tetrabromo diphenyl ether, pentabromo diphenyl ether, hexabromo diphenyl ether, heptabromo diphenyl ether, octabromo diphenyl ether, nonabromo diphenyl ether, decabromo diphenyl ether, tetrabromo bisphenol A and its derivatives, polybrominated biphenyls such as decabromo biphenyl, hexabrom cyclododecane, tetrabromo phthalic anhydride (TBPA), TBPA diester/ether, ethylene bis(tetrabromo phthalimide) (EBTBP), salts of tetrabromophthalates, dibromo ethyl dibromo cyclohexane, ethylene bis(dibromonorbornane dicarboximide), dibromo neopentyl glycol (DBNPG), tribromo neopentyl alcohol (TBNPA), vinyl bromide (VBr), 2,4,6-tribromo phenol (TBP); bis(tribromo phenoxy)ethane (HBPE); tribromo phenyl allyl ether (TBP-AE), poly(dibromo phenylene oxide) (PDBPO), pentabromo ethyl benzene (5-BEB), tetradecabromo diphenoxy benzene (TDB-DPB), poly(pentabromo benzyl acrylate) (PBB-PA), and polydibromostyrene (PDBS).

Suitable nitrogen-containing flameproofing agents are, for example, melamine or melamine salts of boric acid, phosphoric acid, or other inorganic acids.

Examples of suitable flameproofing agents containing phosphorus are phosphate esters, ammonium polyphosphate, triphenyl phosphate, tritolyl phosphate, resorcinol bis(diphenyl phosphate), dimethyl (2-(hydroxymethyl)carbamyl) ethyl)phosphonate, tetraphenyl resorcinol bis(diphenyl phosphate) or organic phosphinates.

Suitable boron-containing flame retardants are, for example, boric acid, borax, borates, zinc borate, barium metaborate, calcium metaborate, sodium tetrafluoro borate, or potassium tetrafluoro borate.

Suitable intumescent flame retardants are, for example, pure melamine, melamine monophosphate, melamine polyphosphate, melamine cyanurate, melamine pyrophosphate, melam (1,3,5triacino-2,4,6-triamino-n-(4,6-diamino-1,3,5-triacin-2-yl), melem (2,5,8-triamino-1,3,4,6,7,9,9b-heptaazaphenalene), [CAS No. 1502-47-2], melon (poly-[8-amino-1,3,4,6,7,9,9b-heptaazaphenalene-2,5-diyl)imino], or expandable graphite.

Examples of particularly preferred flame retardants are oxides, hydroxides, hydrated oxides, and borates of Al, Mg, Ti, Si, Sb, Fe, and Zn, glass balls or hollow spheres of glass, tetrabromo bisphenol A, tetradecabromo diphenoxy benzene, brominated polystyrene, polydibromostyrene (PDBS), decabromo diphenyl ether and derivatives thereof, polybrominated biphenyls and 2,4,6-tribromo phenol and mixtures of two or more of the said flame retardants.

In a preferred embodiment of the invention, one or more further materials for adjusting the viscosity and the rheological properties are added to the resin matrix. The resin matrix used in the present invention can alone have a viscosity which is too low for further processing to form the substrate supported polymer film. Thus suitable materials can be used for adjusting the viscosity of the resin matrix or the mixture used according to the invention for the production of the polymer film. Suitable materials are, for example, silicon dioxide, ceramic materials, and organically modified silicates. These materials can be used individually or intermixed.

In another preferred embodiment of the present invention other additives are used which have an influence on the properties of the invention. The person skilled in the art is familiar with the additives conventionally used in the production of paints and coating materials (cf. "Lackadditive"; Bieleman, Johan; Wiley-VCH-Verlag GmbH, Weinheim, 1998). Suitable additive are, for example, surface-modifying agents, more particularly surface tension-reducing agents such as fluorocarbon-modified polymers.

In order to obtain a uniform and closed surface on the structure coated in the manner herein proposed, it is particularly preferred that the polymer film manufactured by the process of the invention be free from fibers of plastics material, glass, or carbon, in particular, free from fabrics and scrim.

In a particularly preferred embodiment of the invention the additional materials are employed in an amount of from 0 to 85%, preferably from 5 to 75% and more preferably from 10 to 70%, based on the weight of the polymer film subjected to heat treatment.

In a preferred embodiment of the invention, the cyanate component and the alcohol component used for the production of the resin matrix are dissolved in suitable amounts, usually separately or together, in a suitable solvent. Suitable amounts for the purposes of the present invention are those amounts of cyanate and alcohol components which ensure attainment of the aforementioned molar ratio of OCN groups to OH groups. Suitable solvents for the cyanate and alcohol components are known to those skilled in the art, frequently used solvents being, for example, methyl ethyl ketone or acetone. The separately prepared solutions are then mixed.

In another embodiment of the invention, the cyanate component can alternatively be free from solvent and be melted at mild temperatures (ranging, for example, from 40° C. to 80° C.). The alcohol component is added in an amount suitable to achieve the necessary molar ratio.

If desired, a catalyst can be added to accelerate crosslinking, for example a metal acetyl acetonate complex.

For the production of the polymer film according to the invention, one or more further materials are added to the resin matrix. These can be added to one of the solutions or the only solution or to the combined solutions of the cyanate and alcohol components at any desired stage. If the operation is carried out in the absence of solvents, the other materials are added to the solvent-free mixture or to one of the starting components for the mixture. The addition of fillers is carried out usually with dispersal thereof using conventional auxiliaries.

Preferably, the fillers are added, in particular, to the cyanate component before this is combined with the alcohol component, since stirring-in the highly viscous mixture produces heat which markedly increases the reactivity and, at worst, might cause curing of the entire mixture. The alcohol component is then added.

The mixture is then applied to a suitable substrate in the form of a layer, for example, by uniform distribution of the mixture over the substrate. The person skilled in the art will be familiar with the conventional methods of application of a layer, such as knife coating, roller coating, spraying, pouring, immersing, drawing, brush application, brush coating, or centrifugation.

The mixture is applied to a substrate, which will serve as a support material and protective base for the polymer film. Following application of the polymer film to prepreg, and preferably before the prepreg has cured, the substrate is removed from the polymer film.

Suitable support materials are in particular papers or plastics films capable of being stripped from the polymer film of the invention. For this purpose, it is advantageous to use films or papers which consist of materials showing a low surface tension toward water, i.e. are water repellent, or which are coated with such materials. The carrier material for plastics films is preferably a thermoplastic and more preferably a polypropylene. A particularly suitable coating is a silicone coating on one or both sides.

Preferably, the mixture of the invention is applied to the substrate in a layer thickness which ensures that the polymer film manufactured by the process of the invention has a thickness of from 1 µm to 500 µm and preferably from 1 µm to 200 µm. It is particularly preferred that the mixture be applied in a layer thickness which ensures that the polymer film has a thickness of from 1 µm to 150 µm, preferably from 1 µm to 100 µm and more preferably from 1 µm to 70 µm.

The mixture coated as a layer is then subjected to heat treatment at a temperature between 40° C. and 160° C. This heat treatment causes the resin matrix to be prepolymerized, i.e. crosslinked. The temperature used should be such as to ensure that any solvent that might be present is removed but without reaching the gel point of the resin matrix. When a thermoplastic film is used as the supporting substrate, care should also be taken to ensure that the film does not soften.

The conditions of the heat treatment, such as temperature and duration, determine the degree of prepolymerization, i.e., of crosslinking. These are chosen as required, but care must be taken, as already mentioned, to ensure that they do not allow the gel point to be reached, so that remelting and thus subsequent molding is possible. Preferably, the heat treatment is carried out between 40° C. and 160° C., preferably between 50° C. and 130° C. and more preferably between 60° C. and 100° C.

If desired, the mixture used for the production of the polymer film according to the invention can be stored in bulk, without predrying, before it is shaped to a layer. Irrespective of the form, it is preferably kept cool during storage, and the temperature used usually ranges from −40° C. to 0° C., and is preferably −26° C.

Moreover, the polymer film manufactured by the process of the invention can be slightly adhesive such that when it is placed on prepreg, a raw structure, or a mold internal surface it will adhere thereto. On the one hand, the degree of adhesiveness must be sufficient to prevent undesirable slipping. On the other hand, it must be low enough to enable the polymer film of the invention to be readily removed from the surface of the prepreg, the structure, or the mold without it being damaged or destroyed. The degree of adhesiveness can be adjusted without difficulty with means known to the person skilled in the art.

The substrate supported polymer film manufactured by the process of the invention is used in the process of the invention for surface coating fiber/plastics composite materials which have been produced using prepreg, in which the polymer film is placed on a prepreg surface with its resin side facing said surface, prior to molding and curing of the composite structure, after which the supporting substrate is peeled off and the composite structure plus polymer film is then exposed to an elevated temperature for curing.

The polymer film of the present invention is cured at temperatures ranging from 100° C. to 200° C., preferably from 130° C. to 190° C. and more preferably from 150° C. to 170° C. (corresponding to the curing temperature).

Structures of fiber/plastics composite materials, particularly interior structures, are usually produced from prepreg by the crushed core method, i.e. by the autoclave method or the hot press method under pressure, the pressure being selected such that the honeycomb core is also slightly shaped thereby. The substrate supported polymer film of the invention is used in this process as an in-mold coating. This polymer film can, for example, be applied to the prepreg structure just before curing takes place or alternatively, to the prepreg itself during production of the prepreg with optional attachment thereto.

The polymer film of the present invention can, for example, be used in a single-stage process, in which the substrate supported polymer film of the invention is applied to the surface of a prepreg structure, which structure is put into a mold after the substrate has been peeled off and is then removed therefrom following curing.

The polymer film of the present invention can, for example, alternatively be used in a two-stage process, in which the prepreg structure is first of all cured in the mold and removed from the mold following curing, after which the polymer film is applied to the component, and the structure plus polymer film are, following removal of the substrate, again cured in the mold and the coated structure is taken out of the mold after curing.

Since the substrate supported polymer film of the invention can prevent gas evolution of readily volatile components from the prepreg structure due to the formation a very impervious and uninterrupted film, it can preferably be used in the form of a coating on phenolic resin-containing prepreg in a single-stage process.

In a special embodiment of the present invention the polymer film is applied to the surface of a prepreg structure, the prepreg structure, following removal of the substrate, is transferred to a preheated mold, and the mold is subjected to pressure while the prepreg structure is cured. Preference is given to a sandwich structure comprising a honeycomb core between phenolic resin-containing prepreg layers and a curing time of from 2 to 20 minutes, more preferably of from 5 to 15 minutes, at temperatures between 100° C. and 200° C., more preferably at from 140° C. to 170° C., most preferably at 160° C., and under a pressure of from 1.5 to 8 bar, more preferably under a pressure of 4 bar.

The FST properties of a fiber/plastics composite structure coated according to the present invention can, for example, be tested for flame retardancy by the standard testing methods applicable to aviation, such as the International Standard ISO TC92/SC1 or Airbus Direktive ABD0031 tests.

The invention is explained below in greater detail with reference to examples.

EXAMPLE 1

Preparation of the Polymer Film

The cyanate component is degassed, melted at suitable, mild temperatures and, if required, dissolved in acetone. The alcohol component is separately dissolved in acetone. Fillers and flame retardants (cf. Table 1) are added to the cyanate component. The components are then combined and mixed with stirring. If necessary, the viscosity of the mixture is adjusted by the addition of further fillers or additives. The resulting mixtures are in each case knife-coated onto one side of a film siliconed on both sides. The film thus coated is then subjected to heat treatment in an oven at temperatures ranging from 60° C. to 100° C. over a period of from 1 minute to 40 minutes. The conditions used for the heat treatment are governed by the resin matrix used and are such that the degree of prepolymerization or crosslinking of the polymer film lies below its gel point.

TABLE 1

Composition of mixtures for the production of the polymer film

| Constituents | 1a | 1b | 1c | 1d | 1e | 1f | 1g |
|---|---|---|---|---|---|---|---|
| | \multicolumn{7}{c}{Amount in fractions by weight} |
| Cyanate component | | | | | | | |
| Oligo(3-methylene-1,5-phenylene)cyanat | 65 | 65 | 65 | 65 | 65 | 65 | 65 |
| 4,4'-Ethylidene diphenyl dicyanate | 25 | 25 | 25 | 25 | 25 | 25 | 25 |
| Alcohol component | | | | | | | |
| Bishydroxy phenyl sulfide | — | — | — | — | — | — | 10 |
| Bisphenol A | 10 | 10 | 10 | 10 | 10 | 10 | — |
| Solvent | | | | | | | |
| Acetone | — | — | — | — | — | — | a.r.* |
| Other materials | | | | | | | |
| Fluorocarbon-modified polymer | 2 | 2 | 2 | 2 | 2 | 2 | 2 |
| Organic phosphinate | 50 | 25 | 30 | 30 | — | 30 | |
| organophilic bentonite | 10 | 10 | — | — | — | — | |
| Hollow spheres of glass | — | — | — | — | — | 5 | |
| Pyrogenic silica | — | — | 4 | 4 | 4 | 2 | 4 |
| Pigment | 5 | — | — | 5 | 5 | 5 | 5 |

*a.r. = as required

EXAMPLE 2

Production of a Coated Interior Structure for Aircraft

A Nomex Honeycomb core is sandwiched between phenolic resin-impregnated prepreg layers over its entire area. A polymer film of Example 1 is placed on the surfaces of this structure with its resin side facing said surfaces. The supporting film is then removed, the structure placed in a mold heated to 160° C., and the mold closed. A pressure of approximately 4 bar is applied and the structure is compressed at 160° C. for approximately 15 minutes. During the compression period, the structure takes on the shape of the mold and is cured in the mold. The finished structure is then taken out of the mold.

The invention claimed is:

1. A fiber/plastic composite comprising a surface coating, said fiber/plastic composite being produced by a crushed core method from a composite structure comprising a core and at least one prepreg layer, said surface coating comprising a substrate supported polymer film, said polymer film comprising a film of a resin matrix, which is produced using
    (a) at least one difunctional or polyfunctional aromatic organic cyanate and
    (b) at least one difunctional or polyfunctional aromatic alcohol
    in proportions ensuring a molar ratio of OCN groups to OH groups in the starting materials for the production of the prepolymer of from 95:5 to 70:30, and also
    (c) at least one filler,
    wherein the resin matrix has a degree of crosslinking which is below its gel point, wherein said polymer film is applied to a prepreg surface of the at least one prepreg layer with a resin side of the polymer film facing said surface prior to curing of said composite structure, and curing is carried out under applied pressure and at an elevated temperature.

2. The fiber/plastic composite as defined in claim 1 in which the difunctional or polyfunctional aromatic organic cyanate or one of these cyanates is selected from the group consisting of aromatic cyanates of formula I

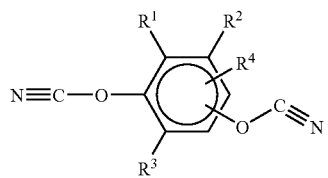

in which $R^1$ to $R^4$ independently denote hydrogen, linear or branched $C_{1-10}$ alkyl, $C_{3-8}$ cycloalkyl, $c_{1-10}$ alkoxy, halogen, phenyl, or phenoxy, wherein the alkyl or aryl groups may be fluorinated or partially fluorinated, aromatic cyanates of formula II

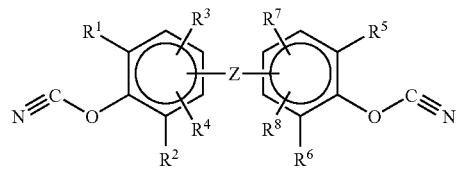

in which $R^5$ to $R^8$ are as defined for $R^1$ to $R^4$ and z is a chemical bond, $SO_2$, $CF_2 CH_2$, CHF, CH ($CH_3$), isopropylene, hexafluoro isopropylene, $C_{1-10}$ alkylene, 0, $NR^9$, N=N, CH=CH, COO, CH=N, CH=—N=CH, alkylene oxyalkylene containing $C_{1-8}$ alkylene, S, Si$(CH_3)_2$ or

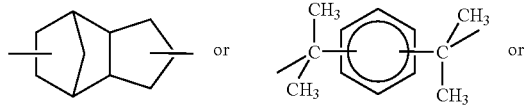

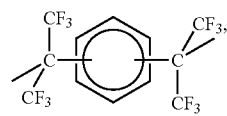

aromatic cyanates of formula III

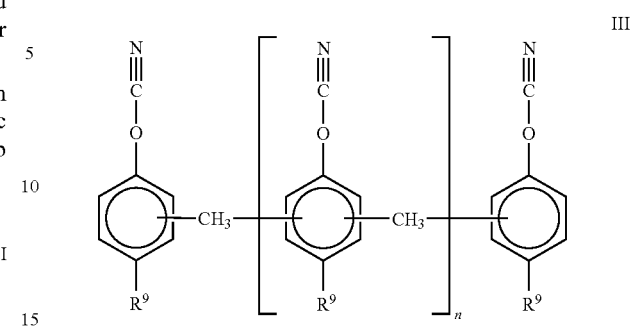

in which $R^9$ denotes hydrogen or $C_{1-10}$ alkyl and n denotes a value of from 0 to 20, and prepolymers of the aforementioned cyanates.

3. The fiber/plastic composite as defined in claim 2, wherein said difunctional or polyfunctional aromatic alcohol or one of these alcohols is selected from compounds of formulas I to III given in claim 2 for cyanates, in which the cyanate groups are replaced by hydroxyl groups.

4. The fiber/plastic composite as defined in claim 2, wherein said difunctional or polyfunctional organic cyanate or one of these cyanates is selected from the group consisting of novolak cyanates, the bisphenol-A dicyanate derivate, 4,4'-ethylidene diphenyl dicyanate and compounds of formula III as defined in claim 2, in which n is 1, 2, or 3, $R^9$ is hydrogen and the methylene group is in each case in ortho position relative to the cyanate group and/or wherein said difunctional or polyfunctional aromatic alcohol or one of these alcohols is selected from the group consisting of bisphenol A and bis (hydroxy phenyl) sulfide.

5. The fiber/plastic composite as defined in claim 1 in which the filler or at least one of the fillers is selected from the group consisting of organophosphoric salts.

6. The fiber/plastic composite as defined in claim 1 in which the filler or at least one of the fillers is selected from the group consisting of silicon dioxide, ceramic materials, organically modified silicones and siloxanes, and mixtures thereof.

7. The fiber/plastic composite as defined in claim 1 in which the content of filler in the mixture is up to 50%, by weight.

8. The fiber/plastic composite as defined in claim 1 in which the polymer film has one or more flame retardants selected from the group consisting of inorganic flame retardants, halogen-containing flame retardants, nitrogen-containing flame retardants, boron-containing flame retardants, and intumescent flame retardants.

9. The fiber/plastic composite as defined in claim 8 in which at least one flame retardant is selected from the group consisting of oxides, hydroxides, hydrated oxides, borates of Al, Mg, Ti, Si, Sb, Fe or Zn, glass balls, hollow spheres of glass, tetrabromo bisphenol A, tetradecabromo diphenoxy benzene, brominated polystyrene, polydibromostyrene (PDBS), decabromo diphenyl ether or derivatives thereof, polybrominated biphenylene, and 2,4,6-tribromo phenol.

10. The fiber/plastic composite as defined in claim 1 in which the mixture contains at least one further additive.

11. The fiber/plastic composite as defined in claim 10 in which said additive is selected from surface-modifying agents.

12. The fiber/plastic composite as defined in claim 1, in which the polymer film has, as substrate, a supporting film composed of a thermoplastic material.

13. The fiber/plastic composite as defined in claim 1, in which the polymer film has a thickness of from 1 to 500 μm.

14. A method for surface coating fiber/plastics composite structures, wherein
  a) a polymer film is applied to a prepreg surface of a fiber/plastics composite structure with a resin side of the polymer film facing said surface, said polymer film comprising a film of a resin matrix, which is produced using at least one difunctional or polyfunctional aromatic organic cyanate and at least one difunctional or polyfunctional aromatic alcohol in proportions ensuring a molar ratio of OCN groups to OH groups in the starting materials for the production of the prepolymer of from 95:5 to 70:30, and also at least one filler, wherein the resin matrix has a degree of crosslinking which is below its gel point,
  b) the substrate is removed from the polymer film prior to curing, and
  c) the composite structure plus polymer film are shaped and cured at a temperature ranging from 130° C. to 200° C., and under a pressure ranging from 1.5 to 8 bar, for a period of approximately 5 to 30 minutes.

15. The method as defined in claim 14, wherein said polymer film is placed in position on said composite structure before said composite structure is placed in a mold.

16. The method as defined in claim 14, wherein said polymer film is first of all placed in a mold and then the composite structure is placed on the polymer film situated in said mold.

* * * * *

UNITED STATES PATENT AND TRADEMARK OFFICE
CERTIFICATE OF CORRECTION

| | | |
|---|---|---|
| PATENT NO. | : 7,968,168 B2 | Page 1 of 1 |
| APPLICATION NO. | : 12/448443 | |
| DATED | : June 28, 2011 | |
| INVENTOR(S) | : Bauer et al. | |

It is certified that error appears in the above-identified patent and that said Letters Patent is hereby corrected as shown below:

In particular, in Column 13, line 44 (line 38 in Claim 2) after the word "alkylene," please change "0" to correctly read: -- O --.

In Column 13, line 45 (Line 39 in Claim 2) please change "CH=-N=CH," to correctly read: -- CH=N-N=CH, --.

In Column 15, line 11 (Line 6 in Claim 14) after the word "which" please change "isproduced" to correctly read: -- is produced --.

Signed and Sealed this
Ninth Day of August, 2011

David J. Kappos
*Director of the United States Patent and Trademark Office*